(12) United States Patent
Calvo

(10) Patent No.: US 11,669,655 B2
(45) Date of Patent: Jun. 6, 2023

(54) METHODS FOR SIMULATING WELDING PROCESSES THAT CAN USE FILLER MATERIAL

(71) Applicant: ANSYS, INC., Canonsburg, PA (US)

(72) Inventor: Abel Ramos Calvo, Madrid (ES)

(73) Assignee: ANSYS, INC., Canonsburg, PA (US)

( * ) Notice: Subject to any disclaimer, the term of this patent is extended or adjusted under 35 U.S.C. 154(b) by 453 days.

(21) Appl. No.: 16/713,769

(22) Filed: Dec. 13, 2019

(65) Prior Publication Data

US 2021/0182450 A1    Jun. 17, 2021

(51) Int. Cl.
| | | |
|---|---|---|
| G06F 30/20 | (2020.01) | |
| G06F 30/27 | (2020.01) | |
| G06F 30/25 | (2020.01) | |
| G06F 119/22 | (2020.01) | |
| G06F 111/00 | (2020.01) | |
| G06F 30/28 | (2020.01) | |

(52) U.S. Cl.
CPC .............. *G06F 30/20* (2020.01); *G06F 30/25* (2020.01); *G06F 30/27* (2020.01); *G06F 30/28* (2020.01); *G06F 2111/00* (2020.01); *G06F 2119/22* (2020.01)

(58) Field of Classification Search
CPC .......... G06F 30/20; G06F 30/25; G06F 30/27; G06F 30/28; G06F 2111/00; G06F 2119/22
See application file for complete search history.

(56) References Cited

U.S. PATENT DOCUMENTS

| | | | | |
|---|---|---|---|---|
| 7,194,447 | B2 * | 3/2007 | Harvey | B23K 9/0953 700/51 |
| 8,706,282 | B2 * | 4/2014 | Sohmshetty | G06F 30/15 706/903 |
| 11,475,792 | B2 * | 10/2022 | Meess | G06F 30/20 |
| 11,538,358 | B2 * | 12/2022 | McLeod | G09B 9/00 |
| 2010/0121472 | A1 * | 5/2010 | Babu | G16Z 99/00 703/2 |

(Continued)

OTHER PUBLICATIONS

Shubert et al, An Abaqus Extension for Welding Simulations, 2010 SIMULIA Customer Conference, 15 pages (Year: 2010).*

(Continued)

*Primary Examiner* — Kibrom K Gebresilassie
(74) *Attorney, Agent, or Firm* — Womble Bond Dickinson (US) LLP

(57) ABSTRACT

In one embodiment, a wizard can automate a setup of a welding simulation by requiring the input of data (e.g. in data entry fields labelled as required) that is used to automatically set up a welding simulation. The wizard can be part of a general purpose mechanical simulation software package, and the wizard can receive inputs from CAD software that specifies the geometrical shapes of bodies of the assembly to be welded and the filling material itself and physical properties of bodies to be welded (e.g. sizes of bodies, number of bodies, physical arrangement and geometries of bodies, melting temperatures, etc.), in addition to the material physical properties and the wizard can provide outputs to the mechanical simulation software package to provide boundary conditions for use in the mechanical simulation software that can use finite element analysis methods in simulations.

22 Claims, 6 Drawing Sheets

(56) References Cited

U.S. PATENT DOCUMENTS

| | | | |
|---|---|---|---|
| 2014/0156240 A1* | 6/2014 | Ruggenenti | G06F 30/23 703/6 |
| 2019/0304338 A1* | 10/2019 | Campbell | G09B 19/003 |
| 2020/0254572 A1* | 8/2020 | Becker | B23K 9/0956 |
| 2021/0182450 A1* | 6/2021 | Calvo | G06F 30/20 |

OTHER PUBLICATIONS

Folchi, Francesca. "Weld Distortion Prediction With Virtual Analysis for Practical Applications." (2014). 137 pages (Year: 2014).*

Asadi, Mahyar, Mike Shubert, Majid Tanbakuei Kashani, and Mathew Smith. "Exploring the Complex Welding Engineering Design Space using Computational Weld Mechanics." 2017 Science in the Age of Experience. 11 pages (Year: 2017).*

Brust, Frederick W., et al. SBIR Phase I Final Report: Adoption of High Performance Computational (HPC) Modeling Software for Widespread Use in the Manufacture of Welded Structures. No. DOE-EMC2-09494. Engineering Mechanics Corporation of Columbus (Emc2), Columbus, OH (United States), 2013. 62 pages (Year: 2013).*

Granell, Ignacio, Abel Ramos, and Alberto Carnicero. "A Geometry-Based Welding Distortion Prediction Tool." Materials 14, No. 17 (2021): 4789. 16 pages (Year: 2021).*

Yang, Yu-Ping, Wei Zhang, Wei Gan, Shuchi Khurana, Junde Xu, and Sudarsanam Suresh Babu. "Online Software Tool for Predicting Weld Residual Stress and Distortion." In ASME 2008 Pressure Vessels and Piping Conference, American Society of Mechanical Engineers Digital Collection. 10 pages (Year: 2008).*

Perzel, Kimberly, and David Kane. "Usability patterns for applications on the world wide web." In Proceedings of the Pattern Languages of Programming Conference, vol. 99. 1999, 17 pages (Year: 1999).*

Authors Unknown, LiveArc—Welding Performance Management System—Owner's Manual, Miller, 2015, 68 pages (Year: 2015).*

Pauwels, Stefan L., Christian Hübscher, Stefan Leuthold, Javier A. Bargas-Avila, and Klaus Opwis. "Error prevention in online forms: Use color instead of asterisks to mark required-fields." Interacting with Computers 21, No. 4 (2009): 257-262 (Year: 2009).*

Shubert et al, "An Abaqus Extension for Welding Simulation" 2010 Simulia Customer Conference, 15 pages (Year: 2010).*

"Solidworks Help", Dassault Systemes, Dec. 11, 2019, 3 pages.

"Weld Quality Simulation", ESI Sysweld, Dec. 11, 2019, 2 pages.

* cited by examiner

METHODS FOR SIMULATING WELDING PROCESSES THAT CAN USE FILLER MATERIAL

BACKGROUND

Welding has been used for many years to join two or more parts that are made from materials that can be welded, usually metals or thermoplastics, by using high heat to melt the materials together at a joint and allowing the materials to cool to cause fusion of the parts. A filler material is often added to the joint prior to the application of heat, and the filler material forms a pool of molten material (the weld pool) after the application of heat and then cools to form the joint that, based on the weld configuration (e.g., a butt configuration) can be stronger than the base material (e.g., parent metals).

The welding process can deform or distort the shape of an assembly of parts due to the thermal process which includes expansion and contraction that occurs during the welding process. It can be difficult to predict the final shape of the assembly as a result of this deformation or distortion which occurs during the welding process. While mechanical simulation software that uses finite element analysis methods can be used to attempt to predict the final shape of an assembly, it can be difficult for many users to properly set up such mechanical simulation software to achieve an adequate simulation of the welding process. The software known as Ansys Mechanical Enterprise, from Ansys Inc. of Canonsburg, Pa., is an example of such mechanical simulation software. There are some software products that can be used for welding. Solidworks from Dassault Systemes includes tools for welding, but they are not able to predict deformation resulting from welding. ESI Sysweld from ESI Group provides a weld quality simulation that is focused on the manufacturing process.

SUMMARY OF THE DESCRIPTION

The embodiments described herein can use a welding wizard to assist in the set up of a welding simulation by collecting the appropriate data about the welding process to simulate the deformation or distortion that occurs as a result of the welding process, and the results from the welding wizard can then be used to provide inputs to mechanical simulation software that can use finite element analysis methods to further simulate the assembly of parts after the welding, and these finite element methods can perform additional analysis such as one or more of: vibration analysis, operation/thermal cycling, structural stress analysis, etc.

In one embodiment, a method can be performed by a data processing system which executes the welding wizard, and this method can include the following operations: displaying a user interface that can receive a set of inputs for welding parameters, the user interface requiring a predetermined set of data that is based on data requirements for a welding simulation, and the user interface is configured to collect the set of inputs that provide the predetermined set of data; receiving, through the user interface, the set of inputs; and performing computations, based on the set of inputs to simulate welding of at least two bodies specified in the set of inputs. In one embodiment, the predetermined set of data can include the following: (A) an identification of the bodies in the simulated welding including at least two bodies; because the wizard can use the CAD identification for the welding bodies, any shape can be used by the user, even solder ball shapes on a ball grid array (BGA) can be used; (B) a number of welding lines or groups; (C) a number of the bodies on each welding line; (D) a total welding time along each welding line; (E) a total cooling time along each welding line; and (F) a solidus temperature of at least one of the bodies in the simulated welding. In one embodiment, the user interface can automate the collection of the set of inputs by specifying input fields as being required before the welding simulation can begin, and the welding wizard can automate the set up of the welding simulation. In one embodiment, the user interface is part of the welding wizard that guides a user through the set up process for the welding simulation, and the welding wizard is operatively coupled to a mechanical computer aided design (CAD) software output that specifies mechanical and physical properties of the bodies in the simulated welding, and one or more outputs of the welding wizard is operatively coupled as an input to a mechanical simulation software. In one embodiment, the outputs from the one or more welding outputs are used to provide a set of one or more boundary conditions that are used as inputs to the mechanical simulation software that can use finite element analysis methods to perform further simulations. In one embodiment, the computations performed by the welding wizard can include computing shrinkage of one or more bodies specified in the set of inputs based on a shrinkage model. In one embodiment, the shrinkage model can use a reference temperature that is set or modified based on a melting point of one or more of the bodies in the welding process. In one embodiment, the reference temperature can be set to be equal to the melting point of the base material or body in the welding process.

In one embodiment, the computations performed by the welding wizard can automatically activate and deactivate user designated elements along a welding line, wherein an activation comprises a cooling process after a melting process of the one or more bodies specified in the set of inputs. In one embodiment, the welding wizard can perform a set of operations during the set up of the simulation, and these operations can include: (a) automatically defining starting and ending points along a welding line; (B) automatically assign an activation time for each separate element along a welding line, based on lengths of elements, that can be separately activated, along the welding line and a total welding time along the welding line; and (C) automatically modify a reference temperature, based on one or more melting points of the elements (that can be separately activated), the modified reference temperature being used in a computation of a shrinkage model that determines a deformation of one or more bodies specified in the set of inputs. In one embodiment, the predetermined set of data captured by the welding wizard's user interface can include a specification of how the bodies are to maintain structural continuity despite the displacements caused by the welding process; the specification can indicate that structural continuity is to be maintained through the use of contacts between the bodies while in another embodiment, structural continuity can be maintained by the use of a conformal mesh applied to one or more bodies in the assembly, using conventional meshing technology known in the art.

The aspects and embodiments described herein can include non-transitory machine readable media that can store executable computer program instructions that when executed cause one or more data processing systems to perform the methods described herein when the computer program instructions are executed. The instructions can be stored in nonvolatile memory such as flash memory or dynamic random access memory (DRAM) which is volatile or other forms of memory.

The above summary does not include an exhaustive list of all embodiments are aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

In one embodiment, a welding wizard can automate a setup of a welding simulation by requiring the input of data (e.g. in data entry fields labelled as "required") that is used to automatically set up a welding simulation. The wizard can be part of a general purpose mechanical simulation software package, and the wizard can receive inputs from CAD software that specifies physical properties of bodies to be welded (e.g. sizes of bodies, shapes of bodies, number of bodies, physical arrangement and geometries of bodies, melting temperatures, etc.), and the wizard can provide outputs to the mechanical simulation software package to provide boundary conditions for use in the mechanical simulation software that can use finite element analysis methods in the simulations performed by the mechanical simulation software package. In one embodiment, the CAD software can be used to specify any shape of the assembled components and any shape for the filling material (welding lines) and can be used to specify filling material that is continuous or discontinuous (such as solder bumps that can have different sizes on a ball grid array on a package for one or more integrated circuits), and these arbitrary shapes can be provided to the welding wizard by the CAD software. The CAD software can be executed in a software process that is separate and distinct from the software process of the welding wizard in one embodiment.

Figure 1A:
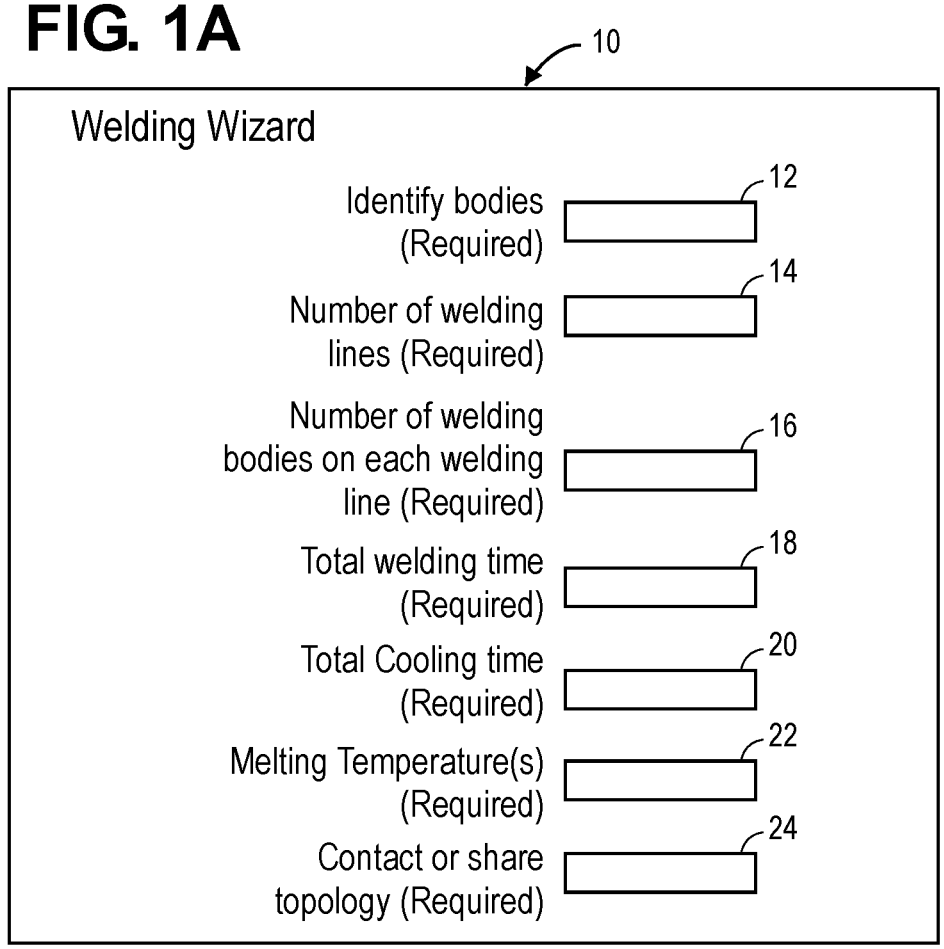
FIG. 1A shows an example of a user interface which can be used to collect data for use by a welding wizard to simulate deformation or distortion caused by a welding process
Figure 1B:
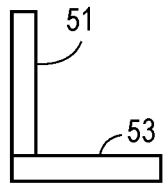
FIG. 1B shows a side view of two bodies prior to the application of heat through a welding process.
Figure 1C:
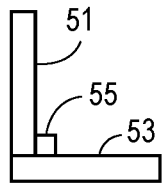
FIG. 1C shows an example of the two bodies in FIG. 1B after a fill material has been applied near the region where the two bodies make contact, which region will be where the joint is created between the two bodies.
Figure 1D:
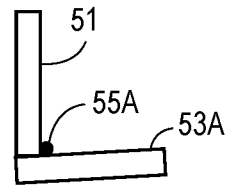
FIG. 1D shows, in a side view, the two bodies after the welding process has formed a joint to weld together the two bodies.

FIGS. 1B, 1C, and 1D illustrate a typical welding process. In this example, two bodies labeled as body 51 and body 53, are going to be joined together by a weld at the point of contact between body 51 and body 53. FIGS. 1B, 1C, and 1D show a side view of the two bodies. As shown in FIG. 1B, body 51 and body 53 form a 90° angle between the two bodies prior to the welding process. As shown in FIG. 1C, a fill material 55 is applied at the point of contact between the two bodies, and this fill material 55 will provide a melt pool during the welding process as heat is applied along the welding line which defines the point of contact between body 51 and body 53. After heat is applied by the welding process, the fill material 55 is converted into fused fill material 55A at the welded joint between bodies 51 and 53A. As shown in FIG. 1D, the bodies 51 and 53 can be deformed and this is shown as a deformation in body 53 in which body 53 is deformed into body 53A; after the deformation caused by the welding process, the angle between the two bodies is now less than 90°. Body 51 may also be deformed as a result of the simulated welding process. The embodiments described herein can provide a welding wizard that can simulate the welding process while at the same time guiding the user through the process of collecting required data in order to do the welding simulation which can determine the deformation due to the welding process.

FIG. 1A shows an example of a user interface that can be displayed by a welding wizard to collect the required set of predetermined data that can then be used to calculate the deformation caused by the welding process. The welding wizard can display the wizard user interface 10 which includes text that describes each of the entry fields shown in the wizard user interface 10. In the example shown in FIG. 1A, there are seven data entry fields shown as entry field 12, entry field 14, entry field 16, entry field 18, entry field 20, entry field 22, and entry field 24. Identifying text that describes each of these entry fields is adjacent to the corresponding entry field. Entry field 12 allows the user to identify the bodies by name or by other indicia, and this entry field is a required entry in order to perform the welding simulation by the welding wizard such that the welding simulation cannot be run without proper data being entered into the entry field 12. The entry field 14 is for entry of data indicating the number of welding lines. This is also required data that is part of the predetermined set of data that is used to perform the welding simulation by the welding wizard and the welding wizard will not perform the welding simulation without the entry of appropriate data in the entry field 14. Entry field 16 requires the entry of the number of welding bodies on each welding line. In the example shown in FIGS. 1B, 1C, and 1D, there are two bodies on a single welding line. Entry field 18 captures data from the user that specifies the total welding time on each welding line. This data entry field requires the data in order to perform the simulation and this is shown in the text "required" associated with data entry field 18. The data entry field 20 receives data from the user that specifies the total cooling time, which is also required by the wizard, for each welding line in the simulation. Data entry field 22 requires from the user one or more melting temperatures of the bodies, and this data is required as shown in the wizard user interface 10. The melting temperature specified in data entry field 22 will be used to create a modified reference temperature as explained below in one embodiment. The user interface of the wizard user interface 10 also includes entry field 24 which can be used by a user to specify how the bodies are to be maintained in structural continuity after the deformation caused by the welding process. In one embodiment, this specification of the connectivity between the bodies in the welding process can be required by the welding wizard. In one embodiment, the welding wizard can accept a selection of how to maintain structural continuity based upon an assortment of different possible mechanisms to maintain structural continuity; for example, in one embodiment, the welding wizard can support the use of contacts or a shared topology which can use meshing technology which meshes or creates a conformal mesh around and/or in the bodies to maintain structural continuity.

Figure 2:
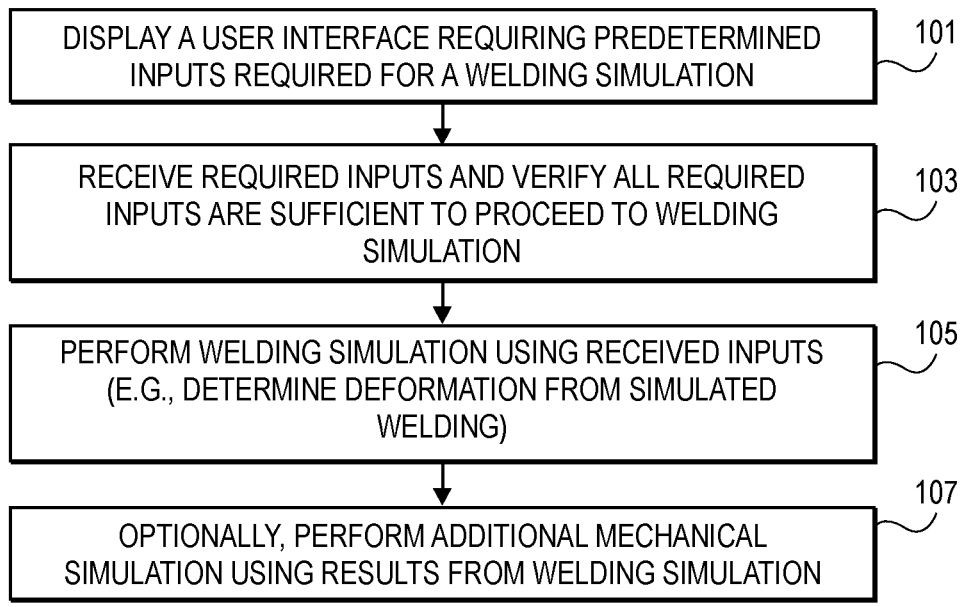
FIG. 2 is a flowchart which shows an embodiment in which a welding wizard can collect data for use in the welding simulation and can perform the welding simulation and optionally can provide the results from the welding simulation to a mechanical simulation software, such as a mechanical simulation software that uses finite element analysis methods to perform one or more various types of known mechanical simulations.

FIG. 2 shows an example of a method that can be performed at least in part by a welding wizard that displays, for example, the wizard user interface 10 shown in FIG. 1A. In operation 101, the welding wizard can display a user interface that requires predetermined inputs that are required for a welding simulation. The user interface can be similar to the user interface shown in FIG. 1A and can indicate which fields are required in order to perform the welding simulation. In one embodiment, proper data must be entered into each field which requires data, and if such data is not entered into a required field, the welding wizard will not attempt to perform the welding simulation and will indicate to the user which fields have missing data that require entry of data in order to complete the set up process to perform the welding simulation. This is shown as operation 103. In that operation, the welding wizard receives the required inputs and verifies that each input is of the proper type and format and that all inputs that are required are sufficient before proceeding to the welding simulation. Thus operation 103 shown in FIG. 2 in effect walks the user through the inputs required and will refuse to perform a welding simulation until the user provides all required inputs which form a predetermined set of data that are required in order to perform the welding simulation. Then in operation 105, the welding wizard can perform a welding simulation using the received inputs. In one embodiment, this can include determining a deformation from the simulated welding. An example of how this deformation can be calculated is provided below in conjunction with FIG. 3. After operation 105, the outputs from the welding wizard can be used in further simulations, including simulations performed by mechanical simulation software which use finite element analysis methods as part of the simulations performed by the mechanical simulation software. This is shown as optional operation 107 in FIG. 2. In one embodiment, the outputs from the simulated welding can be used directly or indirectly to create boundary conditions which are used in the finite element analysis methods of the mechanical simulation software. Thus operation 107 can involve one or more additional simulations of the assembly that was welded in the simulated welding. These one or more additional simulations can include, for example, simulations for vibration, stress, acoustic simulations, thermal simulations, and multiphysics simulations.

Figure 3:
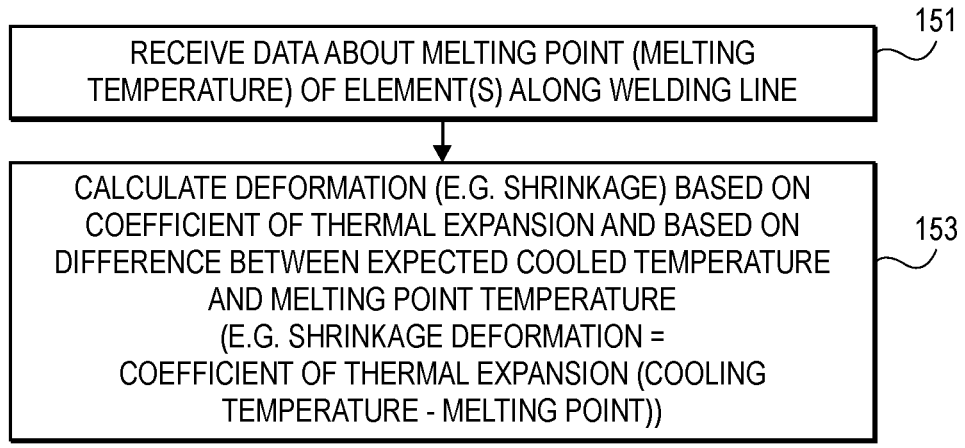
FIG. 3 is a flowchart which shows an embodiment in which the deformation due to welding is computed by using a modified reference temperature which is based upon a melting point temperature of one or more bodies in the welding process.

In one embodiment, the welding simulation performed by a welding wizard in, for example, operation 105 of FIG. 2, can use a shrinkage model that is based upon the melting point of the elements along a welding line. The melting point or melting temperature can be used instead of a reference temperature in a shrinkage deformation computation. An example of such a method is shown in FIG. 3. In operation 151, the welding wizard can receive data about the melting point of elements along a welding line. For example, if body 51 and body 53 shown in FIG. 1B are made of the same material and have the same melting point, the user can input that melting point into the appropriate entry field, such as entry field 22 shown in FIG. 1A. The welding wizard can use this data about the melting point of the two bodies to calculate the deformation based on a coefficient of thermal expansion and also based on a difference between an expected cooled temperature of the bodies (e.g. room temperature if the welding is performed in a room) and the melting point temperature of the bodies. This is shown as operation 153 in FIG. 3. In one embodiment, the shrinkage deformation can be calculated by multiplying the coefficient of thermal expansion of the material by the difference between the final cooled temperature and the melting point of the material. This computation of deformation can more accurately determine the shrinkage deformation which occurs as a result of the heating and then cooling process caused by the welding process. The information derived from this computed deformation can then be used to determine boundary conditions which can then be provided as inputs to the additional mechanical simulation, such as the additional mechanical simulation shown as operation 107 in FIG. 2. These boundary conditions can take into account the effect of thermal changes over time on the structure (transitory thermal structural effect).

Figure 4A:
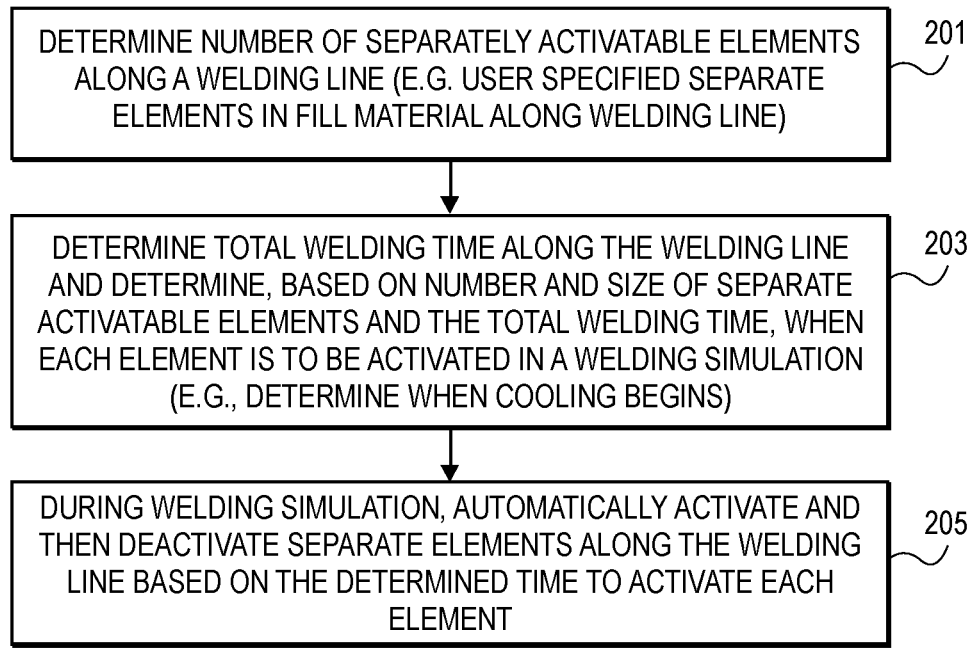
FIG. 4A is a flowchart which illustrates a method according to one embodiment in which elements, that can be separately activated along a welding line, are automatically activated and then deactivated during the welding simulation process.
Figure 4B:
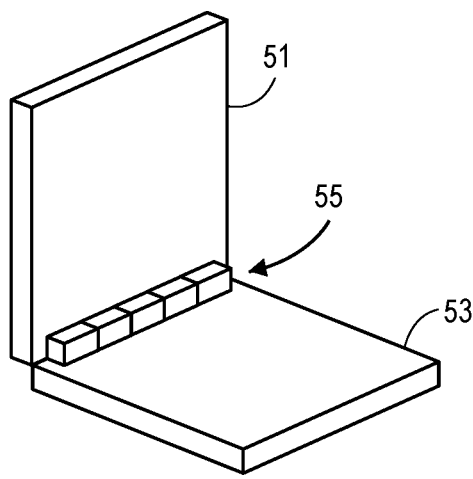
FIG. 4B shows a perspective view of the two bodies shown in FIG. 1C with the fill material 55 being placed adjacent to the region where the joint between the two bodies will be formed.

Another aspect of the embodiments described herein can use the automatic activation of separate elements that can each be activated separately along the welding line. The user can specify a set of separate elements along the welding line, and the number of separate elements can be increased in order to improve the accuracy of the simulation. In other words if a user specifies 10 separate elements along a welding line, this can provide a more accurate simulation then if the user specified only two separate elements along the welding line. In this example, each of the separate elements can be automatically and separately activated over time, where the activation involves a cooling after the element has been heated. The separate elements can be separate filling material (such as separate solder bumps on a BGA) or can be virtually separate sections of a single line of continuous filling material (a continuous welding line). A method which uses this aspect is shown in FIG. 4A. In operation 201 of FIG. 4A, the welding wizard in one embodiment determines the number of separate elements that can be separately activated along a welding line. In one embodiment, the user can specify the separate elements in, for example, the fill material along the welding line or in the material within the bodies to be joined by the welding process. In operation 203, the welding wizard can then determine the total welding time along the welding line, and this can be based upon an input from the user, such as data entered into the entry field 18 shown in FIG. 1A. In operation 203, the welding wizard can determine when each of the separate elements is to be activated during the welding process in the welding simulation and this can determine when cooling begins for each of the separate elements. In one embodiment, the combination of the total welding time and the number and size of each separate element that can be activated can be used calculate when an element is to be activated along the welding line in the welding simulation. For example, if the total welding time along the welding line is 30 seconds and there are two separate elements that can be separately activated, then the first element (the starting point of the welding line) can be activated first at 15 seconds after the start of welding and the second element (at the finishing point of the welding line) can be activated at 30 seconds after the start of welding along the welding line. This time information (such as information about total welding time and cooling times and activation times) can be used to determine transient thermal effects that in turn can have structural effects or implications. In one embodiment, the welding wizard can automatically, during the welding simulation by the welding wizard, automatically activate and then deactivate the separate elements along the welding line based on the determined time to activate each element. In the example shown in FIG. 4B, there are five separate elements shown as five separate blocks of the fill material 55 which are adjacent to the point of contact between body 51 and body 53. Thus, in the example shown in FIG. 4B, each of the five separate elements shown in FIG. 4B can be automatically activated and then deactivated at the appropriate time based upon the method shown in FIG. 4A to provide an accurate simulation of the welding process.

Figure 5:
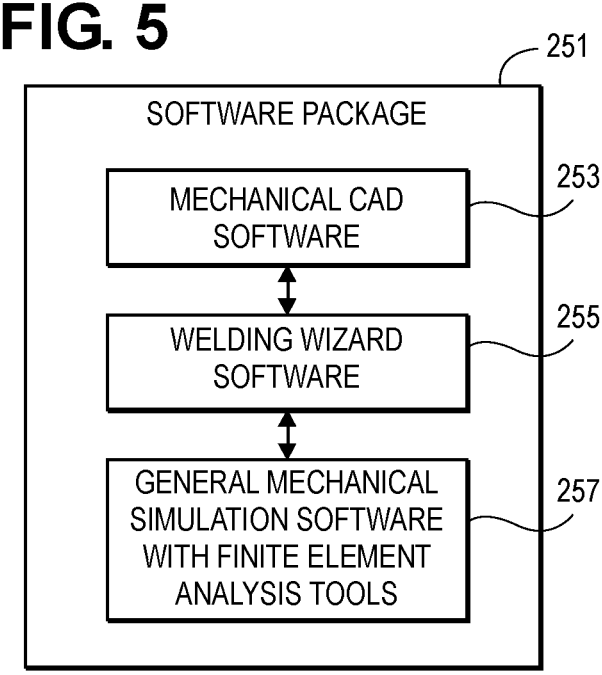
FIG. 5 shows an example of a computer software package that can include various components according to one embodiment described herein.
Figure 6A:
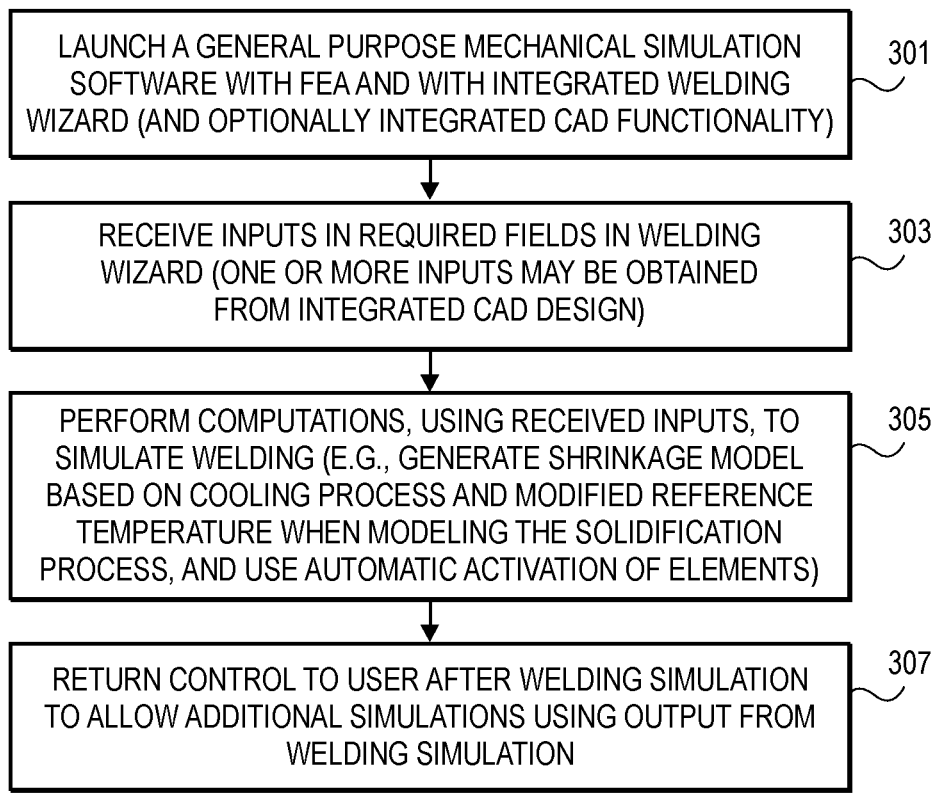
FIG. 6A is a flowchart which illustrates a method according to one embodiment which can use the software package shown in FIG. 5.

In one embodiment, the methods described herein and the system described herein can be performed by a software package that can be an integrated (all-in-one) software package that includes various components that operate together to simulate welding by a welding wizard and to also provide general mechanical simulation using, for example, a finite element analysis tools. FIGS. 5 and 6A provide an example of one such software package. As shown in FIG. 5, the software package 251 can contain three software components which can operate together. In one embodiment, the software package 251 can be an integrated software program which includes all of the components that can operate to provide a user interface for the CAD software as well as a user interface for the mechanical simulation software and also provide the user interface for a welding wizard, such as the user interface shown in FIG. 1A of a welding wizard. In the example shown in FIG. 5, the welding wizard 255 can receive data from and provide data to a mechanical CAD software 253 which can be used to design the dimensions, shapes and materials of the various bodies that are to be joined in a welding process. The welding wizard 255 (which is part of the software package 251) can also be coupled to receive data from the mechanical simulation software and to provide outputs to the mechanical simulation software 257. In an alternative embodiment, each of the software components shown within software package 251 can be separate software components that can be operatively coupled together through, for example application programming interfaces or through data ports or the use of common file formats that allow one software component to read outputs from another software component to provide outputs to yet another software component. In one such alternative embodiment, the welding wizard software 255 and the general mechanical simulation software 257 can be an integrated all-in-one software package that can import or read and process CAD files from separate CAD software that creates the CAD files. The software package 251 can be used to perform the method shown in FIG. 6A. In operation 301 of FIG. 6A, a user can launch a general-purpose mechanical simulation software which uses finite element analysis methods to perform simulations, and this software is integrated with a welding wizard. Further, in one embodiment, this simulation software can also optionally include integrated computer aided design (CAD) functionality. When the user desires to use the welding wizard, the user can invoke the welding wizard within the mechanical simulation software by selecting the wizard and by then providing inputs in the required fields of the wizard. Alternatively, the inputs may be obtained from an integrated CAD functionality that the user has used to create the bodies that will be welded together by the welding process, where the user specified in the CAD functionality that the bodies are to be welded together and will be processed through the welding wizard. After the welding wizard receives the inputs in operation 303, it can be perform computations in operation 305 to simulate welding. For example, the welding wizard can generate a shrinkage model based on a cooling process and a modified reference temperature (see, for example, the method shown in FIG. 3) and can also use the automatic activation process described herein (see, for example the method shown in FIG. 4A). After the welding wizard completes the computations in operation 305, it can return control, in operation 307, to the user who is operating the mechanical simulation software which can be a general-purpose mechanical simulation software which includes finite element analysis methods, such as ANSYS Mechanical. The user at this point can use outputs from the welding simulation to create boundary conditions for the simulations that use finite element analysis methods, and these simulations can be one of a variety of different mechanical simulations that are known in the art such as, for example, dynamic analysis simulations for modal, harmonic, spectrum response, and random vibration, and stress simulations and acoustic simulations, etc.

Figure 6B:
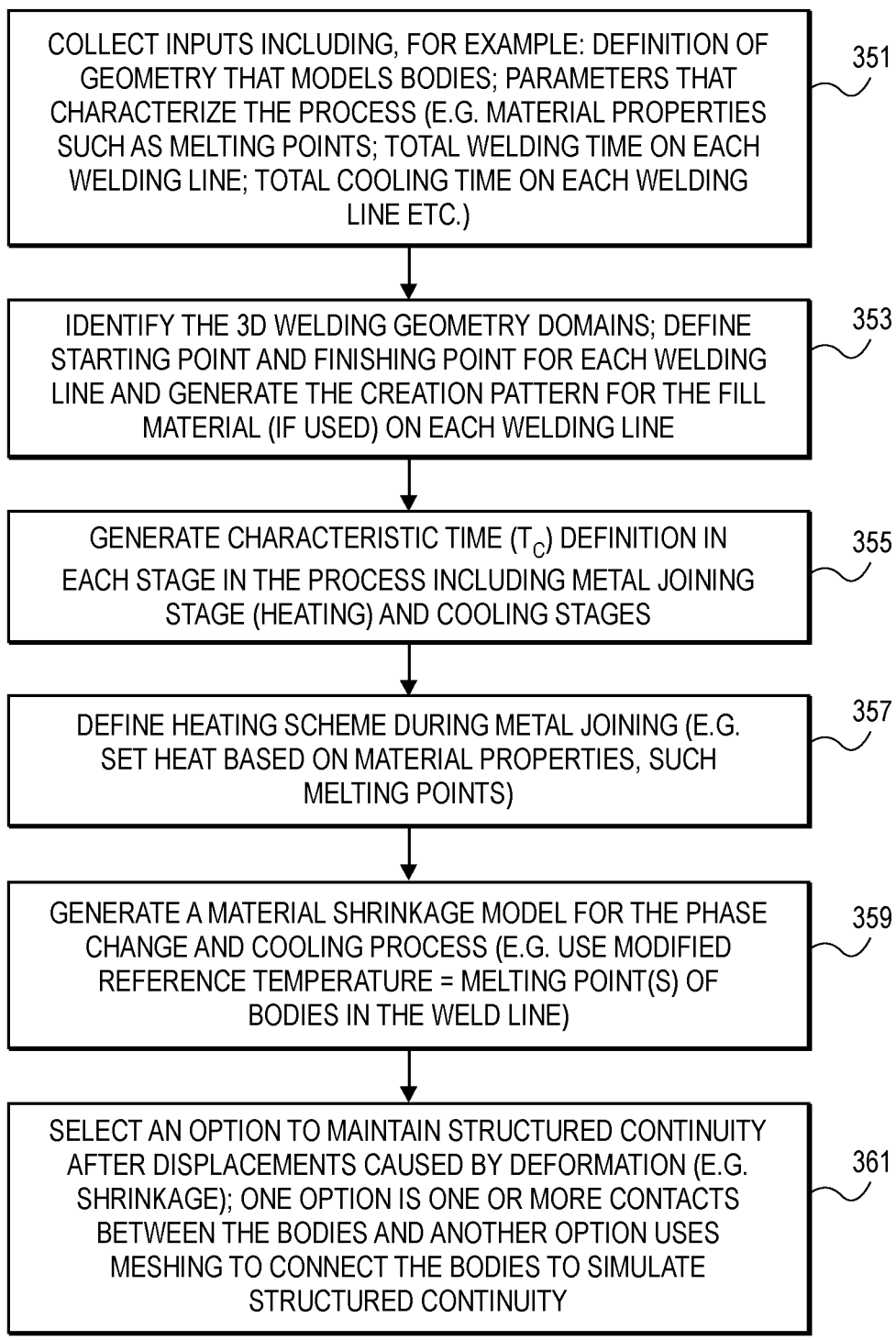
FIG. 6B is a flowchart which shows a method according to one embodiment performed by a welding wizard.

FIG. 6B provides a more detailed example of a method which can be performed by a welding wizard according to one embodiment. In one embodiment, each of the operations shown in FIG. 6B can be performed by the welding wizard prior to providing outputs to a general-purpose mechanical simulation software, such as ANSYS Mechanical Enterprise software from ANSYS Inc. of Canonsburg, Pa. In operation 351, the welding wizard can collect inputs using, for example a wizard user interface such as the user interface shown in FIG. 1A. These inputs can include, for example, the definition of the geometry that models the bodies, the parameters that characterize the process involved in the welding process and this can include material properties of the bodies such as the melting point of the bodies, and other parameters such as total welding time on each welding line, and total cooling time on each welding time, etc. Then in operation 353, the welding wizard can identify the three dimensional welding geometry domains in the bodies and can define the starting point and finishing point for each welding line. Further, the welding wizard can generate the number of steps needed to model the process and generate the filling pattern for the fill material, if used, on each welding line. In operation 355, the welding wizard can assign the proper time for each of the separate bodies based on the length and total time of the process and in addition it can automate the final cooling down steps and modify the simulation analysis settings accordingly. In operation 357, the welding wizard can define the initial temperature on each welding body depending on the load step and can modify the reference temperature for all welding bodies depending on the melting point of the material to properly model the body shrinkage. In addition, the welding wizard can automate the logic for element activation and deactivation depending on the total number of load steps in the total time defined in the model. In operation 359, the welding wizard can generate a material shrinkage model for the phase changes and cooling process, and this material shrinkage model can use the modified reference temperature which can be set to be equal to the melting points of the bodies along the weld line. In operation 361, if the user has chosen the option to use contacts to maintain structural continuity, all contacts can be automatically created where they are needed and the logic to activate and deactivate them is automatically done as well in order to maintain structural continuity using contacts. In another embodiment, a conformal mesh can be used to connect the bodies to simulate the structural continuity at the end of the welding process. After operation 361, processing can be returned back to the user and back to the general mechanical simulation software so that the user can perform further simulations based upon the simulated welding process that has produced a welded joint between the bodies in the simulated welding process.

Figure 7:
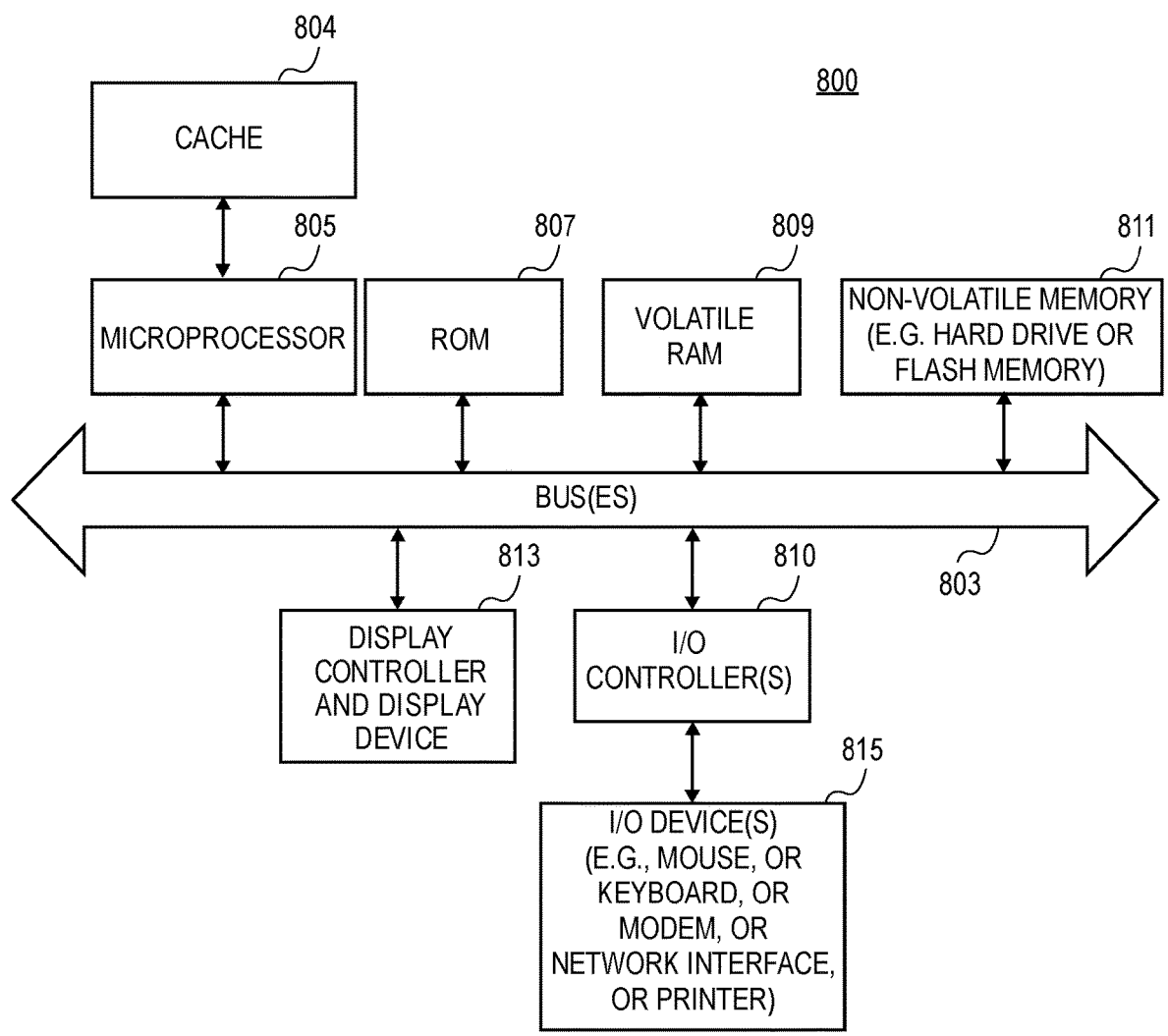
FIG. 7 is a block diagram of a data processing system that can perform or implement one or more embodiments described herein; for example, the data processing system shown in FIG. 7 can perform the method shown in FIG. 2 and can use the user interface shown in FIG. 1A.

FIG. 7 shows one example of a data processing system 800, which may be used with one embodiment. For example, the system 800 may be implemented to provide a system 101 as shown in FIG. 1 or a simulation tool 207 shown in FIG. 2. Note that while FIG. 7 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 7, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 7 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable instructions which when executed by a data processing system cause the data processing system to perform a method, the method comprising:
    displaying, on a display device, a user interface that can receive a set of inputs for welding parameters, the user interface requiring a predetermined set of data that is based on data requirements for a welding simulation, and the user interface is configured to collect the set of inputs that provide the predetermined set of data, and the user interface displays, for each data in the predetermined set of data, indicia indicating that each data in the predetermined set is required;
    receiving, through the user interface, the set of inputs specifying at least two bodies and a welding line;
    performing a setup process based on the set of inputs, the setup process assigning an activation time for an element of the welding line;
    performing computations, based on the set of inputs and the activation time for the element of the welding line to simulate welding of the at least two bodies, wherein the welding simulation predicts a final shape of the at least two bodies including deformations; and
    returning control to the user after the welding simulation of the predicted final shape.

2. The medium as in claim 1 wherein the predetermined set of data comprises: (a) an identification of the bodies in the simulated welding including at least two bodies; (b) a number of welding lines; (c) a number of the bodies on each welding line; (d) a total welding time along each welding line; (e) a total cooling time along each welding line; and (f) a melting temperature of at least one of the bodies in the simulated welding.

3. The medium as in claim 1 wherein the user interface automates the collection of the set of inputs by specifying input fields as required before the welding simulation can begin and automates the setup process for the welding simulation.

4. The medium as in claim 3 wherein the user interface is part of a welding wizard that guides a user through the setup process for the welding simulation and the welding wizard is operatively coupled to a mechanical CAD (computer automated design) software output that specifies mechanical and physical properties of the bodies in the simulated welding and one or more welding outputs of the welding wizard is operatively coupled as an input to a mechanical simulation software.

5. The medium as in claim 1 wherein the one or more welding outputs are used to provide a set of one or more boundary conditions used as inputs to mechanical simulation software that uses finite element methods and wherein the welding wizard returns control to a user and the mechanical simulation software after the one or more welding outputs are provided from the welding wizard to the mechanical simulation software.

6. The medium as in claim 3 wherein the computations comprise computing shrinkage of one or more bodies specified in the set of inputs based on a shrinkage model.

7. The medium as in claim 6 wherein the shrinkage model uses a reference temperature that is set based on a melting point of the one or more bodies.

8. The medium as in claim 7 wherein the reference temperature is set to be equal to the melting point.

9. The medium as in claim 3 wherein the computations automatically activate and deactivate user designated elements along a welding line, wherein an activation comprises a cooling after a melting, of one or more bodies specified in the set of inputs, from application of heat.

10. The medium as in claim 3 wherein the setup process: (a) automatically defines starting and ending points along a welding line; (b) assigns, based on lengths of activatable elements along the welding line and a total welding time along the welding line, an activation time for each of the activatable elements; and (c) modifies a reference temperature, based on one or more melting points of the activatable elements, the modified reference temperature used in a computation of a shrinkage model that determines a deformation of one or more bodies specified in the set of inputs.

11. The medium as in claim 10 wherein the predetermined set of data comprises: (a) an identification of bodies in the simulated welding including at least two of the bodies specified in the set of inputs; (b) a number of welding lines; (c) a number of bodies on each of the welding lines; (d) a total welding time along each welding line; (e) a total cooling time along each welding line; (f) a melting temperature of at least one of the bodies in the simulated welding; and (g) a specification of contacts between bodies after the simulated welding or a shared topology specified in a mesh.

12. A method comprising:
displaying, on a display device, a user interface that can receive a set of inputs for welding parameters, the user interface requiring a predetermined set of data that is based on data requirements for a welding simulation, and the user interface is configured to collect the set of inputs that provide the predetermined set of data, and the user interface displays, for each data in the predetermined set of data, indicia indicating that each data in the predetermined set is required;
receiving, through the user interface, the set of inputs specifying at least two bodies and a welding line;
performing a setup process based on the set of inputs, the setup process assigning an activation time for an element of the welding line;
performing computations, based on the set of inputs and the activation time for the element of the welding line to simulate welding of the at least two bodies, wherein the welding simulation predicts a final shape of the at least two bodies including deformations; and
returning control to the user after the welding simulation of the predicted final shape.

13. The method as in claim 12 wherein the predetermined set of data comprises: (a) an identification of the bodies in the simulated welding including at least two bodies; (b) a number of welding lines; (c) a number of the bodies on each welding line; (d) a total welding time along each welding line; (e) a total cooling time along each welding line; and (f) a melting temperature of at least one of the bodies in the simulated welding.

14. The method as in claim 12 wherein the user interface automates the collection of the set of inputs by specifying input fields as required before the welding simulation can begin and automates the setup process for the welding simulation.

15. The method as in claim 14 wherein the user interface is part of a welding wizard that guides a user through the setup process for the welding simulation and the welding wizard is operatively coupled to a mechanical CAD (computer automated design) software output that specifies mechanical and physical properties of the bodies in the simulated welding and one or more welding outputs of the welding wizard is operatively coupled as an input to a mechanical simulation software.

16. The method as in claim 12 wherein the one or more welding outputs are used to provide a set of one or more boundary conditions used as inputs to mechanical simulation software that uses finite element methods and wherein the welding wizard returns control to a user and the mechanical simulation software after the one or more welding outputs are provided from the welding wizard to the mechanical simulation software.

17. The method as in claim 14 wherein the computations comprise computing shrinkage of one or more bodies specified in the set of inputs based on a shrinkage model.

18. The method as in claim 17 wherein the shrinkage model uses a reference temperature that is set based on a melting point of the one or more bodies.

19. The method as in claim 18 wherein the reference temperature is set to be equal to the melting point.

20. The method as in claim 14 wherein the computations automatically activate and deactivate user designated elements along a welding line, wherein an activation comprises a cooling after a melting, of one or more bodies specified in the set of inputs, from application of heat.

21. The method as in claim 14 wherein the setup process: (a) automatically defines starting and ending points along a welding line; (b) assigns, based on lengths of activatable elements along the welding line and a total welding time along the welding line, an activation time for each of the activatable elements; and (c) modifies a reference temperature, based on one or more melting points of the activatable elements, the modified reference temperature used in a computation of a shrinkage model that determines a deformation of one or more bodies specified in the set of inputs.

22. The method as in claim 21 wherein the predetermined set of data comprises: (a) an identification of bodies in the simulated welding including at least two of the bodies specified in the set of inputs; (b) a number of welding lines; (c) a number of bodies on each of the welding lines; (d) a total welding time along each welding line; (e) a total cooling time along each welding line; (f) a melting temperature of at least one of the bodies in the simulated welding; and (g) a specification of contacts between bodies after the simulated welding or a shared topology specified in a mesh.

* * * * *